UNITED STATES PATENT OFFICE.

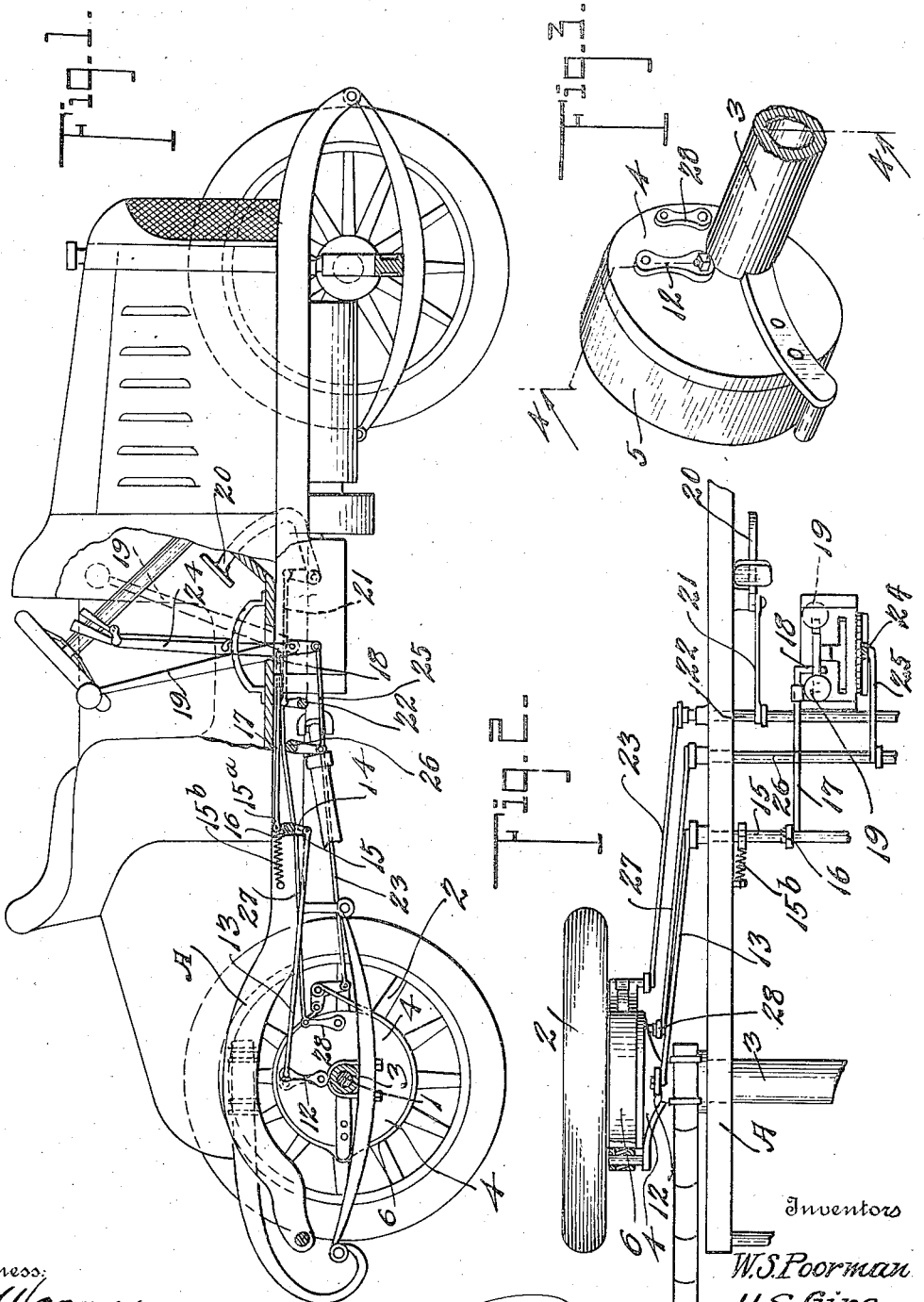

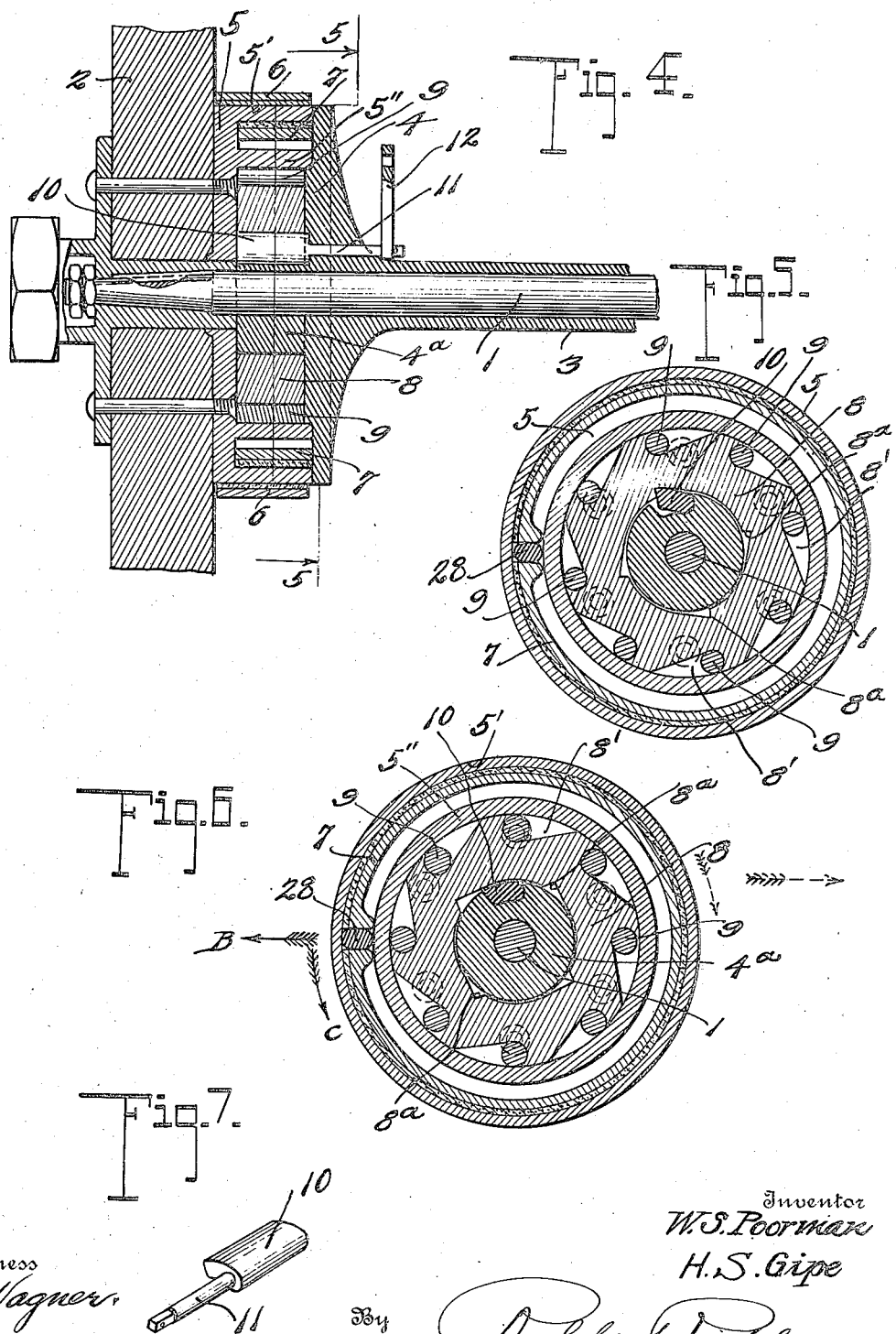

WILLIAM S. POORMAN AND HARRISON S. GIPE, OF PALMYRA, PENNSYLVANIA.

AUTOMATIC REVERSE-MOVEMENT LOCK MEANS.

1,184,567.   Specification of Letters Patent.   Patented May 23, 1916.

Application filed January 5, 1916. Serial No. 70,499.

*To all whom it may concern:*

Be it known that we, WILLIAM S. POORMAN and HARRISON S. GIPE, citizens of the United States, residing at Palmyra, in the counties of Lebanon and Dauphin, respectively, and State of Pennsylvania, have invented certain new and useful Improvements in Automatic Reverse-Movement Lock Means, of which the following is a specification.

The present invention comprises novel reverse movement clutch locking mechanism especially adapted for use in connection with machines controlled by operating mechanism permitting reversing of the driving action of the machine under certain conditions of service, the primary object of the invention being to devise a simple but effective safety locking clutch adapted to operate automatically to prevent reverse motion excepting when the latter is authorized by manually controllable instrumentalities.

An especially advantageous adaptation of the invention is in connection with motor vehicles, and as illustrative of this particular use of the locking clutch means of the invention it may be noted that at the present time in order to hold an automobile stationary it is customary to throw on the brakes of the machine. Where the motor vehicle is on level ground the same may be started readily by the mere release of the brakes and throwing in of the driving clutch of the machine for the driving of the machine wheels in the well known manner. Where, however, a machine is stopped on an ascending grade, and especially in the event the grade is somewhat steep, the ordinary method of starting the machine will frequently permit the vehicle to gravitate rearwardly by reverse movement, when the brakes are released, placing upon the motor an extra load incident to overcoming the reverse momentum aforesaid, when the driving clutch is thrown in to start forward. This extra load is such often as to stall the engine and about the only expedient capable of being resorted to in order to avoid the initial reverse movement of the machine as above described is to maintain the brakes set when the machine is started, this procedure likewise involving an additional load upon the motor in an obvious manner.

The present invention when used on motor vehicles is thoroughly effective under all conditions to act as a reverse movement locking clutch operating automatically to prevent any unauthorized reverse movement of the motor vehicle (as when the brakes are released, or fail to act). Suitable controlling means, however, are provided for the locking clutch mechanism of the invention, to throw the same out of operation incident to the movement of the main transmission control lever to reverse position for authorized reverse movement of the machine, at which time obviously the safety locking clutch must be rendered inactive.

In addition to the foregoing, the lock means of this invention is normally effective to prevent rearward movement of a motor or other vehicle to which it may be applied and affords an excellent safety device for prevention of accidents such as often result on account of absence of some safety lock.

While the invention is possessed of special utility when adapted for employment in connection with motor vehicles, the foregoing explanation of the general constructional and operating features of the invention will suffice to indicate that the invention is susceptible of employment in connection with machines of different types where a driving wheel or element is capable of forward and reverse movements to act upon, and be acted upon respectively, in such movements, by a load factor of one kind or another.

In the accompanying drawings the invention is shown in connection with an ordinary motor vehicle supplied with the customary driving wheels, brake mechanism and selectively controlled transmission devices for obtaining differential forward speeds and reverse motion of the machine.

In the drawings:—Figure 1 is a side view of an automobile equipped with the invention. Fig. 2 is a fragmentary plan view of a portion of the chassis of the motor vehicle, the hand lever controlling the transmission being shown in section and the connections intermediate the brake instrumentalities and the locking clutch device of the present invention being clearly illustrated. Fig. 3 is a perspective view showing the driving end portion of the rear axle housing with directly associated parts of the brake and clutch means. Fig. 4 is a sectional view taken through the hub portion of one of the rear wheels and the brake and clutch instrumentalities adjacent thereto. Fig. 5 is a section taken about on the line 5—5 of Fig. 4 showing the locking clutch in the position of its adjustment for normal forward driving of the vehicle or driving wheel, in which position said clutch will act automatically to prevent unauthorized reverse movement. Fig. 6 is a view similar to Fig. 5 excepting that the clutch means is adjusted for authorized reverse movement of the driving wheel or element. Fig. 7 is a detail view of the locking dog coöperating with the rotative clutch member.

Referring particularly to Figs. 4 to 6, inclusive, it will be observed that the driving axle or shaft 1 is connected in the customary manner with the hub portion of the wheel 2, the latter being one of the rear drive wheels of a motor vehicle. The axle or shaft 1, termed hereinafter the driving element, is mounted in the usual axle housing 3, the latter being formed at its outer end or ends with the circular flange 4 which constitutes virtually a closure for the inside of the brake drum 5. The brake drum 5 is formed with the outer rim 5' and the inner clutch rim 5''. Coöperating with the brake rim 5' externally is the contractible brake band 6, and the expansible brake shoes 7 coact with the said rim 5' internally, all in quite the customary way. The drum 5 is attached to the wheel 2 as usual and within the space surrounded by the clutch rim 5'' is disposed the rotative clutch member 8. The clutch member 8 is formed with a plurality of pockets or recesses 8' located in its periphery and each having an inclined wall on which operates a clutch roller or element 9. When the clutch rollers 9 are in the deepest portions of the recesses or pockets 8' they are inactive so far as their clutch function is concerned, and the inactive positions of the rollers 9 are assumed when the relative movement of the parts 5'' and 8 is such as to tend to roll the members 9 toward the deepest portions of the pocket. Any opposite relative movement of the parts 8 and 5'' obviously will tend to cause the rollers 9 to move toward the outermost peripheral portions of the member 8 and the action of the parts 9 is such under these conditions as to immediately lock the parts 8 and 5' and consequently the parts 8 and 5 together. As noted in Figs. 4 to 6, the flange 4 of the housing 3 is formed with a hollow boss 4ª and the latter form constitutes a bearing for the clutch member 8 both when said member 8 is stationary and when it rotates under conditions to be hereinafter described. Likewise the boss 4ª forms a support for a locking dog 10 pivotally mounted in a recess in the peripheral portion of the boss 4ª, the outer surface of the dog being curved coincident with the curvature of the said peripheral portion of the boss so that the dog may be adjusted to lie flush in its recess as seen in Fig. 6. The pivotal movement of the dog 10 upon the boss 4ª is permitted by providing a pivot 11 which extends through the flange 4 to a point exterior to the housing 3 and carries fixed thereto an operating arm 12.

It is contemplated to utilize any suitable means for controlling movement of the arm 12 to shift the dog into the positions in which it is shown in Figs. 5 and 6, and such means will be varied according to the adaptation of the invention as a safety locking clutch device for different kinds of machines. However, according to the adaptation shown, referring more particularly to Figs. 1 and 2, a rod 13 is connected at its rear end to the arm 12 and at its front end to an arm 14 on the shaft 15 supported in any suitable way on the chassis A of the motor vehicle. A second arm 16 on the shaft 15 is connected with an actuating rod 17 which extends forward and is guided in any suitable way so that a projection 18 on said rod is disposed in the path of movement of the hand lever 9 controlling the variable speed transmission mechanism of the machine. By this arrangement, bearing in mind that the position of the projection 18 of rod 17 is such that said rod cannot be actuated excepting when the lever 19 is moved into a position for reverse driving of the machine, it will be apparent that movement of the dog 10 may be effected from the transmission control mechanism. Figs. 1 and 2 likewise illustrate the conventional operating means for the brake devices, the foot brake lever 20 being connected by link 21 with the shaft 22 and said shaft having an arm connected by the rod 23 with the brake band 6, this constituting the foot or service brake. Likewise the hand brake lever 24 is connected by link 25 with the shaft 26 in turn connected by rod 27 with the cam 28 (see Figs. 5 and 6) by which the brake shoes 7 are operated expansively, this being the usual hand or emergency brake.

In addition to the foregoing details, there is provided for the shaft 15 by which the clutch dog arm 12 is actuated, an upstanding arm 15ª having a spring 15ᵇ connected thereto and normally acting to hold the shaft in a position in which the dog 10 is upraised or operative, as shown in Fig. 5, and to restore the dog to such position after it has been rendered temporarily inactive as will now be set forth.

General operation: The normal position of the parts of the safety clutch mechanism of the invention is shown in Fig. 5 wherein it will be observed that the dog 10 is tilted upward so as to engage one of a plurality of notches 8ª formed in the clutch member 8. With this adjustment of the parts, assuming the direction of movement of the driving wheel or element 2 to be that of the arrow B (Fig. 6), the rotative movement of the driving wheel 2 will be in the direction of the arrow C, the driving element or shaft 1 turning necessarily in the same direction. Under these conditions the clutch member 8 remains stationary, the clutch rollers 9 being seated in the deepest portions of the recesses 8' and the brake drum and its rims turning freely around said member 8. Should the machine stop, or should for any other reason there be a tendency of the machine to move rearward unauthorizedly, the clutch member 8 being locked against movement in a direction reverse to the arrow C, the slightest reverse turning of the driving wheel 2 and brake drum 5 would result in the immediate locking of the brake drum to the clutch member 8 incident to the clutching action of the clutch rollers 9. Having in view the foregoing it will be apparent that even if the vehicle to which the invention is applied is on an upwardly ascending grade, it is possible to entirely release the brake means including the parts 6 and 7 and the vehicle will be locked against rearward movement, the parts being arranged according to the adjustment in Fig. 5.

Under certain conditions it is necessary, of course, to cause rearward movement of a vehicle and when this is done authorizedly incident to the movement of the transmission control lever 19 to its selective reverse position, said lever will engage the projection 18, rock the shaft 15, actuate the rod 13, and consequently the arm 12, in such a manner as to lower the dog 10 to the position in which it is shown in Fig. 6. The reverse turning of the driving member or wheel 2 when the parts are adjusted as last described will result of course in clutching action of the clutch rollers 9 against the rim 5″ so that the clutch member 8 will turn with the rim 5″, drum 5 and wheel 2, and this is permitted because the dog 10 has been positioned now to release the clutch member 8 for the said movement.

The interpositioning of the clutch member 8 between the drum 5 and the fixed or stationary support comprising the boss 4ª and the axle housing 3 is necessary and desirable in order that it may be possible for the safety clutch mechanism of the invention to act instantaneously practically to lock the driving member 2 against reverse movement when the parts of the clutch device are not adjusted for such movement, or in other words, when the movement is not authorized under the manual control of the operator.

It will be understood that more broadly speaking the axle housing 3 and its parts 4 and 4ª constitute virtually a stationary support adjacent to the driving wheel or member 2 on which support, of course, the clutch dog 10 is mounted.

Having thus described the invention, what is claimed is:

1. In safety locking clutch means of the class described, the combination of a forwardly and reversely operable driving member, a stationary part adjacent thereto, a clutch member on the stationary part and movable in the direction of reverse movement of the driving member, automatic clutch means intermediate said driving member and said clutch member permitting forward movement of the driving member independently of the clutch member and acting to prevent reverse movement of the driving member independently of said clutch member, and means to lock said clutch member against movement in a direction corresponding with reverse movement of the driving member.

2. In safety locking clutch means of the class described, the combination of a forwardly and reversely operable driving member, a stationary part adjacent thereto, a movable clutch member on the stationary part, clutch means intermediate said driving member and said clutch member permitting forward movement of the driving member independently of the clutch member and acting to prevent reverse movement of the driving member independently of said clutch member, means to lock said clutch member against movement in a direction corresponding with reverse movement of the driving member, means for controlling authorized reverse movement of the driving member, and means operable by the last named means to control the action of said lock means.

3. In safety locking clutch means of the class described, the combination of a driving member, a relatively stationary part adjacent thereto, a clutch member rotative relative to said stationary part, automatic acting clutch means intermediate said driving member and said clutch member for connecting the same on predetermined relative movement, and disconnecting the same on other predetermined relative movement, lock means coöperative with the clutch member to prevent movement of the same in one direction, and manual means for releasing the clutch member with respect to said lock means.

4. In safety locking clutch means of the class described, the combination of a driving member, a relatively stationary part adjacent thereto, a clutch member rotative relative to said stationary part, automatic acting clutch means intermediate said driving member and said clutch member for connecting the same on predetermined relative movement and disconnecting the same on other predetermined relative movement, lock means coöperative with the clutch member to prevent movement of the same in one direction, manual means for releasing the clutch member with respect to said lock means, and means to compel driving of the driving member in the predetermined directions referred to included in the aforesaid manual means.

5. In safety locking clutch means of the class described, the combination of a driving member having a clutch rim fixed thereto, a support adjacent to said driving member, a clutch member adapted for rotation with respect to said support, automatic clutch means intermediate said clutch member and the rim whereby to operatively connect said parts incident to movement of the driving member in one direction and permitting free relative movement of said parts incident to movement of the driving member in an opposite direction, a clutch dog carried by said support and coöperative with the clutch member aforesaid to lock the same against movement when said clutch member is in clutched connection with said rim, and means for moving said clutch dog into and out of coöperation with respect to said clutch member.

6. In safety locking clutch means of the class described, the combination of a driving member having a clutch rim fixed thereto, a support adjacent to said driving member, a clutch member adapted for rotation with respect to said support, clutch means intermediate said clutch member and the rim whereby to operatively connect said parts incident to movement of the driving member in one direction and permitting free relative movement of said parts incident to movement of the driving member in an opposite direction, a clutch dog carried by said support and coöperative with the clutch member aforesaid to lock the same against movement when said clutch member is in clutched connection with said rim, means for moving said clutch dog into and out of coöperation with respect to said clutch member, transmission mechanism for operating said driving member forwardly and reversely, controlling means for said transmission mechanism movable to effect said reverse operation of the driving member, and operating means for said clutch dog operable incident to the reverse controlling movement of said controlling member.

7. In safety locking clutch means of the class described, the combination of a driving member having a clutch rim fixed thereto, a support adjacent to said driving member, a clutch member adapted for rotation with respect to said support, automatic clutch means intermediate said clutch member and the rim whereby to operatively connect said parts incident to movement of the driving member in one direction and permitting free relative movement of said parts incident to movement of the driving member in an opposite direction, a clutch dog carried by said support and coöperative with the clutch member aforesaid to lock the same against movement when said clutch member is in clutched connection with said rim, means for moving said clutch dog into and out of coöperation with respect to said clutch member, a brake drum formed with said clutch rim, brake mechanism coöperative with said drum, transmission mechanism for operating said driving member forwardly and reversely, controlling means for said transmission mechanism movable to effect said reverse operation of the driving member, and operating means for said clutch dog operable incident to the reverse controlling movement of said controlling member.

8. In safety locking clutch means of the class described, the combination of a driving wheel, mechanism for operating said wheel forwardly and reversely, a clutch rim adapted to turn with said wheel, a rotative clutch member adjacent to said rim, clutch devices intermediate said clutch member and rim for automatically connecting the two as an incident to reverse movement of the wheel and rim, a stationary support, and a clutch dog carried by said support and movable into and out of engagement with the clutch member aforesaid to prevent and permit, respectively, movement of said clutch member.

9. In safety locking clutch means of the class described, the combination of a driving wheel, mechanism for operating said wheel forwardly and reversely, a clutch rim adapted to turn with said wheel, a rotative clutch member adjacent to said rim, clutch devices intermediate said clutch member and rim for automatically connecting the two as an incident to reverse movement of the wheel and rim, a stationary support, a clutch dog coöperative with the clutch member and carried by said stationary support, transmission mechanism for forwardly and reversely driving said wheel, a controlling member for said transmission mechanism movable for effecting reverse driving of the wheel, and means intermediate said controlling member and said clutch dog to release the clutch member for the dog incident to movement of the controlling member for reverse driving action of the wheel.

10. In safety locking clutch means of the class described, the combination of a driving wheel, a clutch rim affixed thereto, a driving shaft connected with said wheel, a stationary housing for said shaft formed with a boss concentric with respect to said rim, a rotative clutch member intermediate said boss and the rim, automatically operating clutch rollers intermediate the clutch member and the rim for connecting said parts on movement of the driving wheel in one direction, a clutch dog mounted on said boss and engageable with the clutch member aforesaid to lock the same from movement when the clutch rollers aforesaid are operated to connect the clutch member and the rim, and means for operating the dog to release the clutch member.

11. In safety locking clutch means of the class described, the combination of a driving wheel, a clutch rim affixed thereto, a driving shaft connected with said wheel, a stationary housing for said shaft formed with a boss concentric with respect to said rim, a rotative clutch member intermediate said boss and the rim, automatically operating clutch rollers intermediate the clutch member and the rim for connecting said parts on movement of the driving wheel in one direction, a clutch dog mounted on said boss and engageable with the clutch member aforesaid to lock the same from movement when the clutch rollers aforesaid are operated to connect the clutch member and the rim, means for operating the dog to release the clutch member, the said boss forming a bearing for the clutch member and the clutch member being formed with internal notches with which the dog is adapted to interlockingly engage.

In testimony whereof we affix our signatures.

WILLIAM S. POORMAN.
HARRISON S. GIPE.